April 5, 1938.  G. SOLTESZ  2,113,062

STABLE DOUBLE MECHANICAL LEVEL INDICATOR

Filed Nov. 16, 1936  2 Sheets-Sheet 1

INVENTOR.

Gabriel Soltesz.

April 5, 1938.   G. SOLTESZ   2,113,062
STABLE DOUBLE MECHANICAL LEVEL INDICATOR
Filed Nov. 16, 1936   2 Sheets-Sheet 2
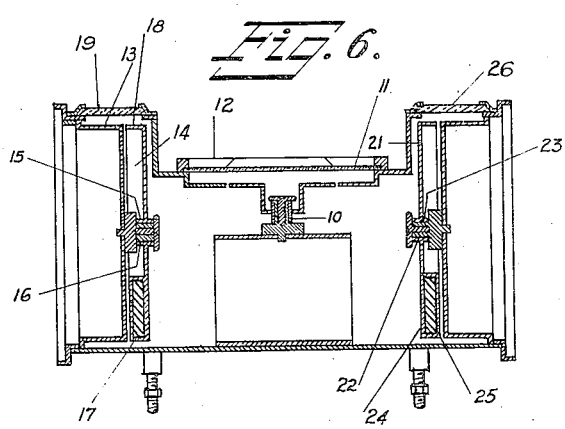
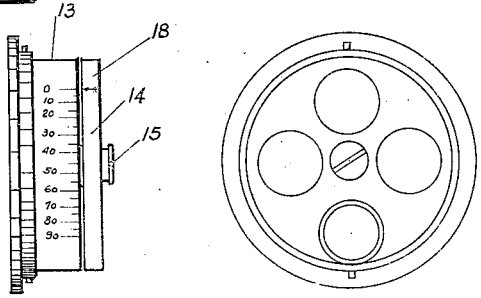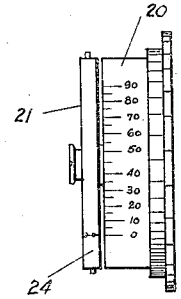
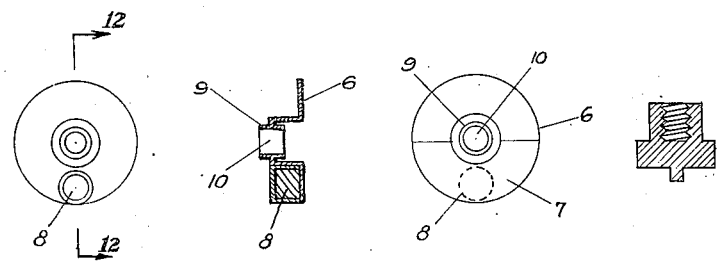
INVENTOR.
Gabriel Soltesz.

Patented Apr. 5, 1938

2,113,062

UNITED STATES PATENT OFFICE 2,113,062

STABLE DOUBLE MECHANICAL LEVEL INDI-
CATOR

Gabriel Soltesz, Chicago, Ill.

Application November 16, 1936, Serial No. 111,040

1 Claim. (Cl. 33—215)

This invention relates to a novel and improved stable double mechanical level indicator which indicates simultaneously two directional deviation angles from the horizontal plane.

The main object of the invention is to provide an instrument for airships, military and commercial airplanes which simultaneously indicates and measures, when flying in fog, clouds and at night, or whenever the horizon is obscured in the longitudinal and the transverse direction the deviation of the machine from the horizontal plane.

Another object of the invention is to enable the pilot to set, by means of this instrument, the machine in advance to a predetermined climb or to a safe descent.

Another object of the invention is to provide an instrument to determine, during the test flights, the proper setting of the wings, the stabilizing planes of new and reconditioned airplanes for normal flight.

Still another object of the invention is to set the airplane in proper postion when dropping bombs.

A further object of the invention is to approximately set the projectiles in a predetermined firing position.

A further object of the invention is to measure the two directional deviations of warships, steamers, submarines and sail boats.

A still further object of the invention is to enable the driver of a tank, mountain locomotive, or automobile, to properly judge the surrounding topography.

A further object of the invention is to measure simultaneously the deviations from the horizontal and the vertical at building and construction work.

The use of the stable double mechanical level indicator is more advantageous than the liquid type, because its function is positive, and it indicates the actual deviation. It differs from the liquid type in another respect, namely, parts measuring the ascent and descent are acting independently from each other.

With the foregoing and other objects in view, which will appear as the description proceeds, the invention consists in certain novel features of construction and arrangements of parts hereinafter more fully described, illustrated in the accompanying drawings, and particularly pointed out in the appended claim, it being understood that various changes in the form, proportion, size and minor details of the structure may be made without departing from the spirit or sacrificing any of the advantages of the invention. I have illustrated in the accompanying drawings a preferred embodiment of the invention, from an inspection of which, when considered in connection with the following description, the invention, its mode of construction and assembly, and many of its advantages, shall be readily understood and appreciated.

For the purpose of facilitating an understanding of the invention, I consider it mounted upon the instrument board of an airplane.

Referring to the drawings in which similar characters of reference are employed to indicate corresponding parts throughout the several figures of the drawings:

Figure 6 is a central transverse sectional view.

Figure 8 is an elevational view of the indexed instrument part indicating during descent the deviation from the horizontal with its indicator wheel.

Figure 9 is a typical end view of the instrument parts 8 and 10.

Figure 10 is an elevational view of the indexed instrument part indicating during ascent the deviation from the horizontal with its indicator wheel.

Figure 11 is a front elevational view of a colored indicator wheel, which indicates on the inner circle of the index cover plate.

Figure 12 is a cross section on line 12—12 of Figure 11.

Figure 13 is a rear elevational view of the colored indicator.

Figure 14 is an enlarged typical cross sectional view of the bearings of the indicator wheels.

Figure 1:
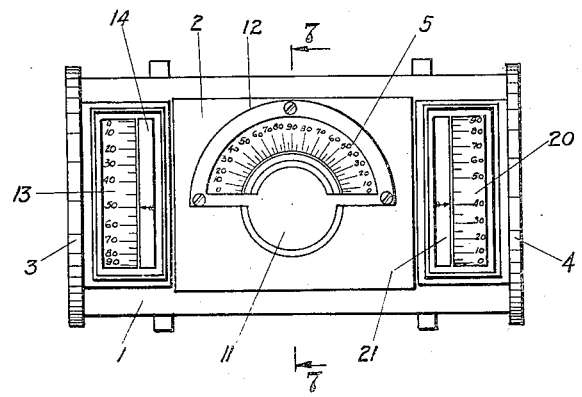
Figure 1 is a frontal view of the instrument.
Figure 7:
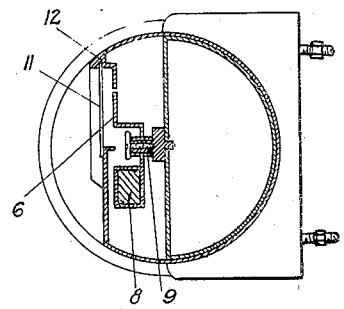
Figure 7 is a cross sectional view on line 7—7 of Figure 1.
Figure 2:
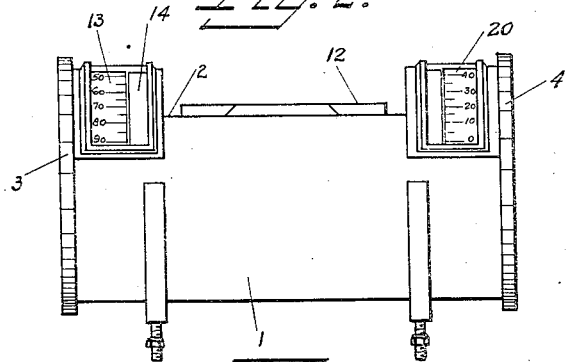
Figure 2 is a bottom view of the same.
Figure 4:
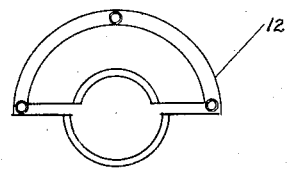
Figure 4 is a frontal view of the glass frame.
Figure 3:
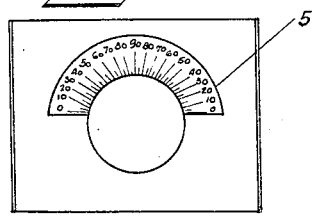
Figure 3 is the indexed cover plate of the instrument part indicating the deviation from the horizontal.
Figure 5:
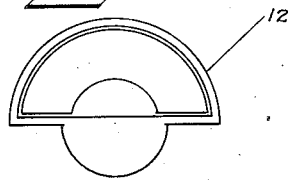
Figure 5 is a rear view of the glass frame.

The instrument housing 1, holds the transverse deviations indicating portion 2, the longitudinal deviations of descent indicating portion 3, and the longitudinal deviations of ascent indicating portion 4. The transverse deviations indicating portion 2, shows a stationary division plate 5, which cooperates with a rotatably mounted wheel 6, one half of the periphery of said wheel 6, is vividly colored; in the axial central plan of this vividly colored portion 7, of the wheel 6, a leadweight 8, is enclosed, which makes the wheel 6, heterogeneous. Said wheel 6, is mounted upon a longitudinally disposed axle 9, which is supported by proper bearing surfaces 10. This disposition of the heterogeneous wheel 6, causes the wheel 6, to constantly hold to the plumb line, i. e., it becomes stable relative to the vertical position during all transverse deviations of the airplane from the horizontal. This whole mechanical combination disposed within the transverse deviations indicating portion 2, is covered by a glass-plate 11, which is fastened to a frame 12.

The longitudinal deviation of descent indicating portion 3, holds a stationary division drum 13, which cooperates with a rotatably mounted wheel 14, said wheel 14, is mounted upon a transversely disposed axle 15, which is supported by proper bearing surfaces 16. Wheel 14, is made heterogeneous by enclosing into its peripheral portion at a certain freely elected place a leadweight 17, disposed in the axial plane of said selected place. This disposition of the heterogeneous wheel 14, causes said wheel to constantly hold to the plumb line during all longitudinal deviations from the horizontal. A sector 18, measuring 90 degrees, of the periphery of wheel 14, disposed directly opposite the leadweight 17, is vividly colored. The mechanism disposed within the portion 3, is covered by the glass 19.

The longitudinal deviation of ascent indicating portion 4, holds a stationary division drum 20, which cooperates with a rotatably mounted wheel 21, said wheel 21, is mounted upon a transversely disposed axle 22, which is supported by proper bearing surfaces 23. One quarter 24, of the peripheral portion of the wheel 21, is vividly colored. In the axial central plane of this vividly colored one quarter 24, of the peripheral portion of the wheel 21, a leadweight 25, is enclosed, whereby said wheel 21, becomes heterogeneous, and consequently it will constantly hold to the plumb line during all longitudinal deviations from the horizontal. The mechanism enclosed within the portion 4, is covered by the glass 26.

Operation of the stable double mechanical level indicator:

As long as the airplane which is equipped with this instrument is in a perfectly horizontal plane, no vividly colored sections of the wheels 6, 14, and 21, are visible on their respective indicators. As soon as the airplane deviates from the horizontal plane either transversely or longitudinally, the colored sections of the wheels 6, 14, and 21, will appear in front of one or the other indicator.

To illustrate my invention more fully, be it assumed that the airplane transversely deviates from the horizontal. The instrument housing 1, being mounted upon the plane, will follow the movements of the airplane, i. e., the stationary division plate 5, which is rigidly connected with the housing 1, will uncover colored sections of the wheel 6, on the side nearest to the dipping wing.

If the airplane longitudinally deviates from the horizontal, the descent and the ascent have to be considered separately.

In the descending position, the nose of the airplane will occupy a lower level than the tail portion, consequently the instrument will perform a partial revolution around a transversely disposed axle; as a result of this partial revolution, the division drum 13, will uncover colored sections of wheel 14, while the division drum 20, although performing the same movement, will uncover no colored portions of wheel 21.

In the ascending position, the picture will be reversed. While the airplane is rising, the stationary division drum 13, uncovers no colored sections of wheel 14, however the division drum 20, uncovers colored sections of the wheel 21.

Knowing now the relative movements of the various indicators and their respective heterogeneous wheels, we recognize that the starting point of each scale has to be fixed according to the special purpose for which it is constructed. The starting points of the scale destined to measure transverse deviations are therefore located on the ends of a semi-circle, while the 90 degree marking is in the center of the arc.

The starting point of the scale destined to measure longitudinal deviations of descent forms the top of the scale of the division drum 13. The starting point of the scale destined to measure longitudinal deviations of ascent forms the bottom of the scale of the division drum 20.

The edge of the colored section of any of the wheels 6, 14, and 20, serves as a means which indicates the magnitude of the respective type of deviation from the horizontal.

What I claim as new and desire to secure by Letters Patent is:

A stable double mechanical level indicator for measuring longitudinal deviation angles from the horizontal, disposed within a housing containing two side portions, each of said side portions comprising means to measure longitudinal deviations from the horizontal, said means including a stationary drum in each side portion, the functions of the two drums complementing each other so, that on one drum the horizontal deviations of descent are visible, while on the other drum the horizontal deviations of ascent appear only, said complementary function of the two stationary drums being obtained by special arrangement of their indicating scales on the drums, and by rotating indicating means, said indicating means consisting of two heterogenous wheels, arranged in such a way that they always hold to the plumbline, rotating however independently of each other around transverse horizontal pivots; each of said wheels possessing a suitably disposed indicator section, each of said indicator sections cooperating with the scale disposed on its respective drum showing thereby the magnitude of descent on the scale of one drum and the magnitude of ascent on the scale of the other drum.

GABRIEL SOLTESZ.